US012341256B2

(12) United States Patent
Lin et al.

(10) Patent No.: US 12,341,256 B2
(45) Date of Patent: Jun. 24, 2025

(54) DUAL-POLARIZATION CAVITY-BACKED ANTENNA, PACKAGE MODULE, AND ARRAY PACKAGE MODULE

(71) Applicant: National Taiwan University, Taipei (TW)

(72) Inventors: Yi-Cheng Lin, Taipei (TW); Tzu-Ming Huang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 209 days.

(21) Appl. No.: 18/216,448

(22) Filed: Jun. 29, 2023

(65) Prior Publication Data

US 2025/0007179 A1 Jan. 2, 2025

(51) Int. Cl.
*H01Q 21/24* (2006.01)
*H01Q 1/50* (2006.01)
*H01Q 1/52* (2006.01)

(52) U.S. Cl.
CPC ............... *H01Q 21/24* (2013.01); *H01Q 1/50* (2013.01); *H01Q 1/52* (2013.01)

(58) Field of Classification Search
None
See application file for complete search history.

(56) References Cited

U.S. PATENT DOCUMENTS

2020/0373666 A1* 11/2020 Takaki .................. H01Q 5/307
2021/0159610 A1* 5/2021 Manesh ................. H01Q 21/24
2022/0344832 A1* 10/2022 Sayama ............... H01Q 21/065
2023/0089629 A1* 3/2023 Ouyang ................... H05K 1/02 343/720
2024/0339763 A1* 10/2024 Morita ................... H01Q 23/00
2024/0356214 A1* 10/2024 Steward ............... H01Q 21/065
2024/0356222 A1* 10/2024 Chiang .................... H01Q 1/50
2024/0421465 A1* 12/2024 Acikalin ................. H01L 23/66
2024/0421479 A1* 12/2024 Hwang .................... H01Q 5/50

FOREIGN PATENT DOCUMENTS

TW I481115 B 4/2015

* cited by examiner

*Primary Examiner* — Wilson Lee
(74) *Attorney, Agent, or Firm* — Birch, Stewart, Kolasch & Birch, LLP

(57) ABSTRACT

Disclosed are a dual-polarization cavity-backed antenna, a package module and an array package module. The antenna includes a substrate, a magnetic current feeding structure, an electric current feeding structure, and a cavity-backed structure that is arranged between two surfaces of the substrate. The magnetic current feeding structure and the electric current feeding structure transfer energy into the cavity-backed structure, respectively radiating the orthogonally polarized electromagnetic wave. The electric field direction of the first electromagnetic wave and the magnetic field direction of the second electromagnetic wave occur on the same plane. The package module includes the dual-polarization cavity-backed antenna, a radio frequency control chip, and a control circuit unit. The array package module includes a plurality of the dual-polarization cavity-backed antennas, a radio frequency control unit including a single RF chip or chip set, and a control circuit unit.

10 Claims, 6 Drawing Sheets

DUAL-POLARIZATION CAVITY-BACKED ANTENNA, PACKAGE MODULE, AND ARRAY PACKAGE MODULE

BACKGROUND OF THE INVENTION

Field of the Invention

The present invention relates to an antenna technology, particularly to a dual-polarization cavity-backed antenna and a package module and an array package module.

Description of the Prior Art

The prosperous development of wireless communication technology has brought many challenges in the concerned fields. In the field of antenna design, Taiwan patent No. 1481115, a prior art, proposes an antenna unit and an antenna array module to solve the problems of the cavity-backed antennas, such as small bandwidth, great back radiation, and unnecessary surface-wave radiation. However, the prior art does not take dual-polarization design into consideration but only provides a single input source and a unidirectional polarization electromagnetic radiation.

Therefore, how to realize high isolation and eliminate external interference in a coplanar and identical-level condition is a problem the concerned field is eager to solve for dual-input source and dual-polarization design of a cavity-backed antenna.

SUMMARY OF THE INVENTION

Considering the conventional problems, one objective of the present invention is to provide a dual-polarization cavity-backed antenna and a package module incorporating the dual-polarization cavity-backed antenna and RF elements to achieve broadband high isolation, large bandwidth, external interference elimination, and unidirectional radiation.

According to the objective of the present invention, the present invention provides a dual-polarization cavity-backed antenna, which comprises a substrate, a magnetic current feeding structure, an electric current feeding structure, and a cavity-backed structure. The substrate has a first surface and a second surface opposite to the first surface. A first metal layer is disposed on the first surface. A second metal layer is disposed on the second surface. A radiation aperture is formed in the second metal layer. A plurality of first metallic through vias is disposed around the perimeter of the radiation aperture. The plurality of the first metallic through vias is electrically connected with the first metal layer and the second metal layer to form the cavity-back structure. The magnetic current feeding structure is disposed on the second surface and feeds a magnetic current into the radiation aperture to make the radiation aperture radiate a first electromagnetic wave having a first polarization direction. The electric current feeding structure is disposed on the second surface and feeds an electric current into the radiation aperture to make the radiation aperture radiate a second electromagnetic wave having a second polarization direction. The second polarization direction is orthogonal to the first polarization direction. The magnetic current feeding structure and the electric current feeding structure simultaneously radiate the first electromagnetic wave and the second electromagnetic wave in the radiation aperture which is co-located. The direction of the electric field of the first electromagnetic wave and the direction of the magnetic field of the second electromagnetic wave are co-existed.

In some embodiments, the radiation aperture is formed on the second metal layer; a region of the second metal layer, which is corresponding to the radiation aperture, is an aperture etching area revealing the second surface of the substrate; two opposite lateral sides of the radiation aperture are respectively a first side and a second side.

In some embodiments, the magnetic current feeding structure includes a coupling opening, a crossing opening, and a first conductor. The coupling opening is formed in a region of the second surface, which is adjacent to the first side. A region of the second metal layer, which is corresponding to the coupling opening, is an aperture etching area revealing the second surface of the substrate. One end of the coupling opening is connected with the first side, and another end of the coupling opening extends toward a direction far away from the radiation aperture. The crossing opening is formed in a region of the second surface, which is between (or crossed by) two ends of the coupling opening, wherein a region of the second metal layer, which is corresponding to the crossing opening, is an aperture etching area revealing the second surface. The first conductor is disposed inside the crossing opening and extends inside a region, which is between two ends of the coupling opening. The first conductor receives a first feeding source and transmits the first feeding source to make the first feeding source coupled to the coupling opening. The first feeding source is transmitted to the radiation aperture through the coupling opening, and the edge of the radiation aperture radiates the magnetic current in form of the first electromagnetic wave.

In some embodiments, one end of the crossing opening passes through the coupling opening, and another end of the crossing opening extends toward a region of the second surface, which is outside the cavity-backed structure, and reaches a perimeter of the substrate. The first conductor is a first metal transmission line. The first metal transmission line extends from one end of the crossing opening to another end of the crossing opening and further extends along a lateral side of the substrate to a first feeding source receiving port, which is formed on the first surface, to receive the first feeding source.

In some embodiments, one end of the crossing opening passes through the coupling opening; another end of the crossing opening extends toward a region of the second surface, which is outside the cavity-backed structure. The first conductor is a first metal transmission line. The first metal transmission line is disposed inside the crossing opening. A second metallic through via is formed in a region of the substrate, which is outside the cavity-backed structure and corresponding to the first metal transmission line. One end of the second metallic through via is connected with the first metal transmission line; another end of the metallic through via is connected with the first feeding source receiving port, which is formed on the first surface, to receive the first feeding source.

In some embodiments, the electric current feeding structure includes a tunnel opening, and a second conductor. The tunnel opening is formed on a region of the second surface, which is adjacent to the second side. One end of the tunnel opening communicates with the radiation aperture and is opposite to one end of the coupling opening. Another end of the tunnel opening extends to a region outside the radiation aperture. The second conductor is disposed on the second surface and inside the radiation aperture and the tunnel opening, and the second conductor is separated from the second side by a distance. The second conductor receives a second feeding source and transmits the second feeding source to the radiation aperture; the second conductor inside the radiation aperture radiates the current in the form of the second electromagnetic wave.

In some embodiments, another end of the tunnel opening extends to a perimeter of the substrate; the second conductor comprises a second metal transmission line and a third metal transmission line. The second metal transmission line is disposed inside the radiation aperture. One end of the third metal transmission line is connected with the second metal transmission line at one end of the tunnel opening. Another end of the third metal transmission line extends to another end of the tunnel opening to reach a perimeter of the second surface and further extends along a lateral side of the substrate to a second feeding source receiving port, which is formed on the first surface, to receive the second feeding source.

In some embodiments, another end of the tunnel opening is extended to a region of the substrate, which is outside the cavity-backed structure; the second conductor includes a second metal transmission line, a third metal transmission line, and a third metallic through via. The second metal transmission line is disposed inside the radiation aperture. One end of the third metal transmission line is connected with the second metal transmission line at one end of the tunnel opening. Another end of the third metal transmission line extends to another end of the tunnel opening. The third metallic through via penetrates the substrate. One end of the third metallic through via is connected with the third metal transmission line; another end of the third metallic through via is connected with a second feeding source receiving port, which is formed on the first surface, to receive the second feeding source.

According to the objective of the present invention, the present invention also provides a package module, which comprises the dual-polarization cavity-backed antenna mentioned above, a radio-frequency control unit, and a control-circuit unit. The radio-frequency control unit includes a plurality of first metallic balls. The plurality of first metallic balls is connected with the dual-polarization cavity-backed antenna. The control-circuit unit includes a plurality of second metallic balls. The plurality of second metallic balls is also connected with the dual-polarization cavity-backed antenna. Two of the plurality of first metallic balls or two of the plurality of second metallic balls are respectively a first feeding source output port and a second feeding source output port. The first feeding source output port is connected with the first feeding source. The second feeding source output port is connected with the second feeding source.

According to the objective of the present invention, the present invention also provides an array package module. The array package module is different from the package module in that the array package module comprises a plurality of dual-polarization cavity-backed antennas. The radio-frequency control unit includes a single RF chip or a plurality of RF chips. The single RF chip of the radio-frequency control unit is connected with the plurality of dual-polarization cavity-backed antennas, whereby the RF chip can control the plurality of dual-polarization cavity-backed antennas. Alternatively, each of the plurality of RF chips of the radio-frequency control unit is connected with one of the plurality of dual-polarization cavity-backed antennas, whereby each RF chip can control the dual-polarization cavity-backed antenna connected thereto.

In the present invention, the magnetic current feeding structure uses the radiation of the magnetic current to generate the first electromagnetic wave in the second surface, and the electric current feeding structure uses the radiation of the electric current to generate the second electromagnetic wave, whereby to prevent from the interference of electric field and magnetic field of the first electromagnetic wave and the second electromagnetic wave, and whereby to increase the degree of isolation of the first electromagnetic wave and the second electromagnetic wave. Further, the cavity-backed structure isolates the first electromagnetic wave and the second electromagnetic wave from the environmental interference. Furthermore, the cavity-backed structure constrains the first electromagnetic wave and the second electromagnetic wave from radiating into space respectively along single directions. Thus, the package module, which is formed by the dual-polarization cavity-backed antenna, the radio-frequency control unit, and the control circuit unit, can propagate outward effectively.

DETAILED DESCRIPTION OF THE INVENTION

Figure 1:
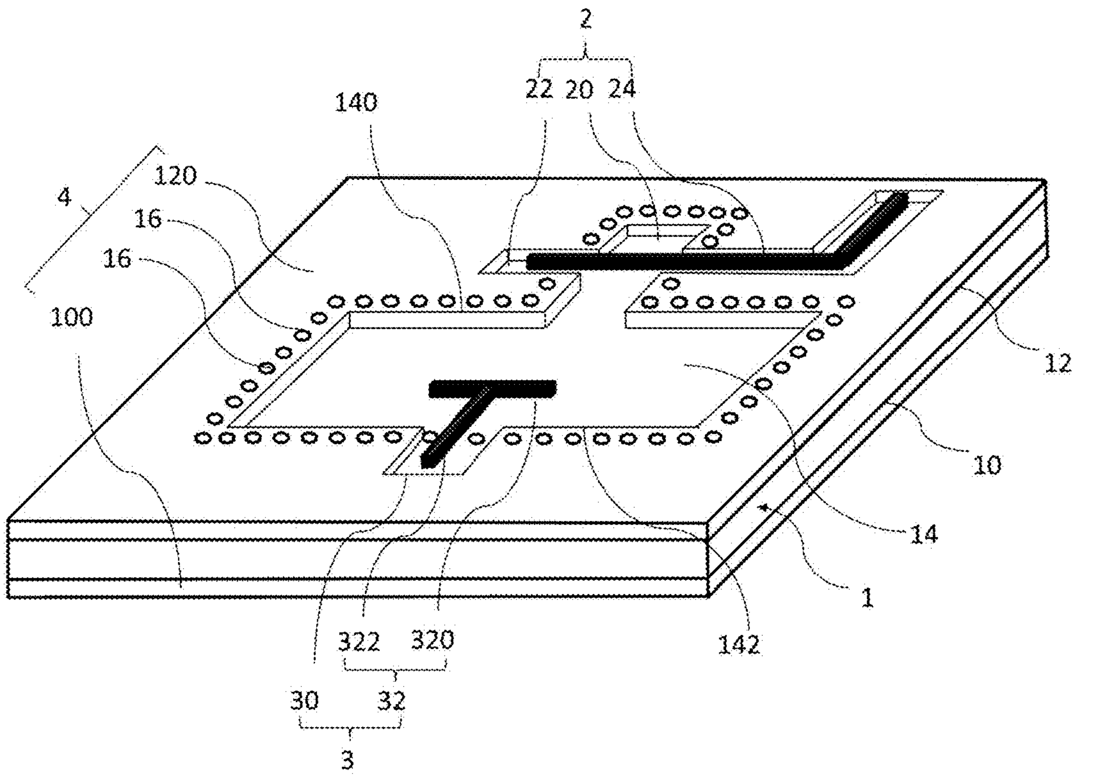
FIG. 1 is a perspective view schematically showing a dual-polarization cavity-backed antenna according to one embodiment of the present invention.

The following text and the related drawings will be used to further demonstrate the embodiments of the present invention. The identical symbol will be use to designate the similar or identical component in the specification and drawings as far as possible. In the drawings, the shapes and thicknesses may be exaggerated for simplicity and convenience. It should be understood: the elements, which belong to the conventional technology and are well known by the persons having ordinary knowledge in the art, are not necessarily shown in the drawings or described in the specification. It should be understood also: the persons skilled in the art would be able to modify or vary the embodiments of the present invention without departing from the spirit of the present invention.

While the ordinals, such as "first", "second", and "third", are used to describe common objects, it is only to mean that these objects are different individual existences of similar objects but not to indicate that these objects should be arranged in a specified temporal/spatial order or in any specified sequence unless there is a particular explanation in the text.

Refer to FIG. 1. The present invention provides a dual-polarization cavity-backed antenna, which comprises a substrate 1, a magnetic current feeding structure 2, an electric current feeding structure 3, and a cavity-backed structure 4. The substrate 1 may be made of a dielectric material, such as a printed circuit board. The substrate 1 has a first surface 10 and a second surface 12 opposite to the first surface 10. A first metal layer 100 is disposed on the first surface 10. The first metal layer 100 may be made of a copper foil or an electric-conduction metal. A second metal layer 120 is disposed on the second surface 12 of the substrate 10. A radiation aperture 14 is formed in the second metal layer 120. A region of the second metal layer 120, which is corresponding to the radiation aperture 14, is an aperture etching area revealing the second surface 12 of the substrate 10. Two opposite lateral sides of the radiation aperture 14 are respectively a first side 140 and a second side 142. A plurality of first metallic through vias 16 is disposed around the perimeter of the radiation aperture 14 and between two surfaces of the substrate 1. The plurality of the first metallic through vias 16 is electrically connected with the first metal layer 100 and the second metal layer 120 to form the cavity-back structure 4.

Figure 2:
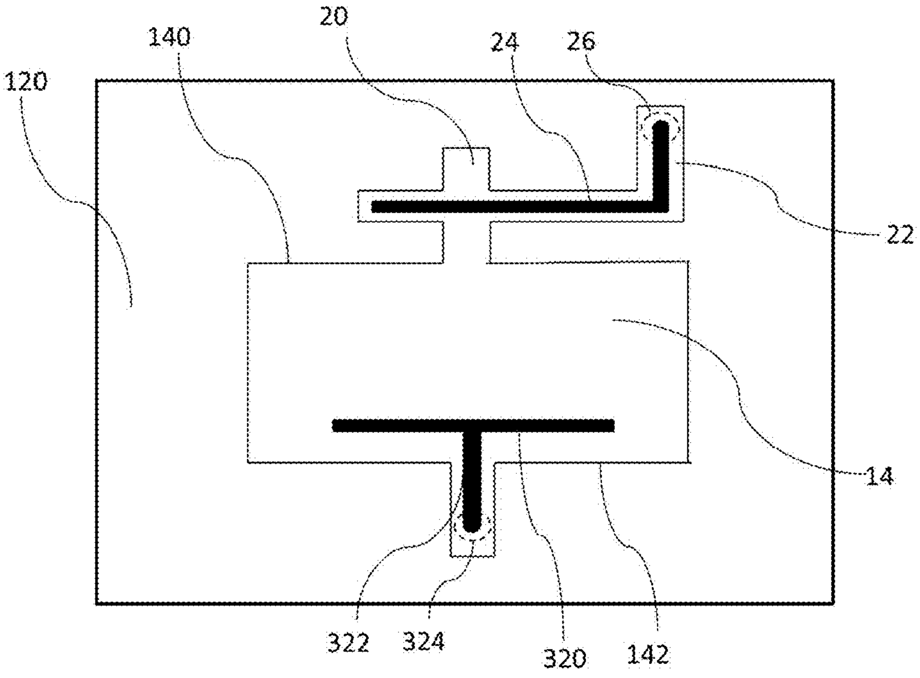
FIG. 2 is a diagram showing the cavity-backed structure omitted from FIG. 1.
Figure 3:
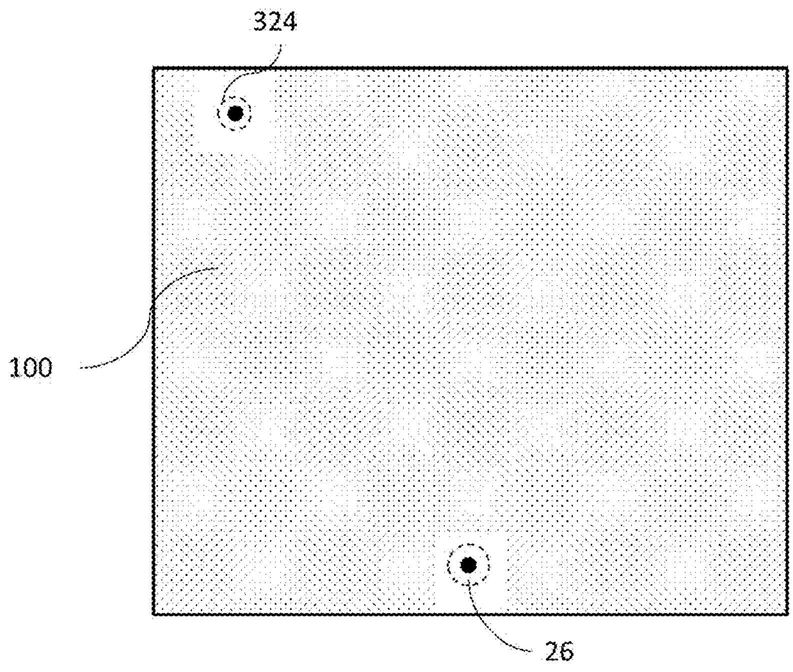
FIG. 3 is a bottom view of the dual-polarization cavity-backed antenna shown in FIG. 1.
Figure 4:
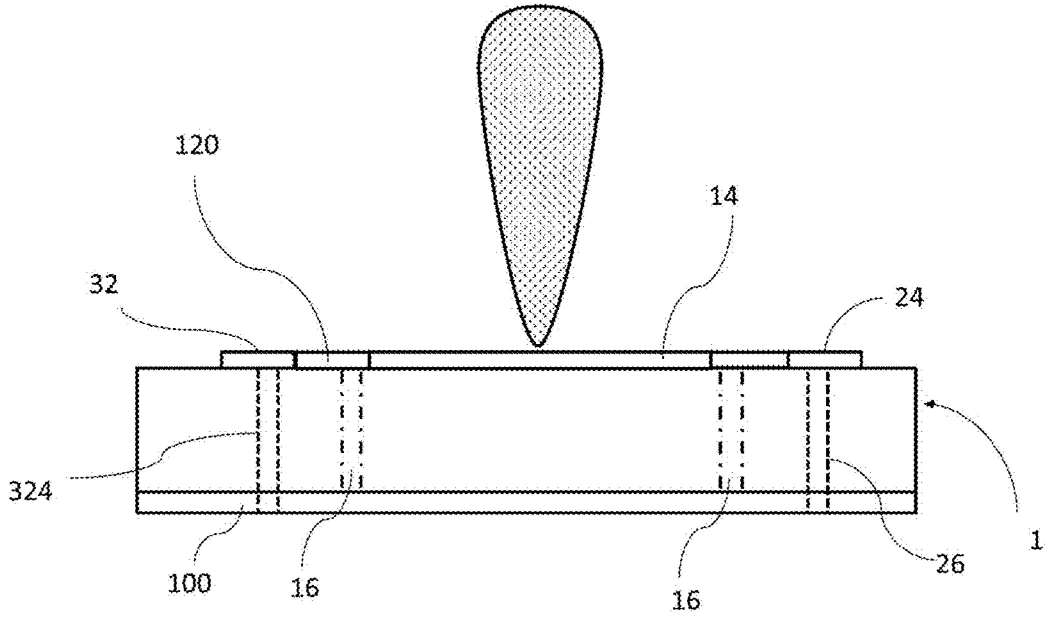
FIG. 4 is a sectional view of the dual-polarization cavity-backed antenna shown in FIG. 1.

Refer to FIGS. 2-4. The droplet shape shown in FIG. 4 denotes a single radiation direction. In the present invention, both the magnetic current feeding structure 2 and the electric current feeding structure 3 are disposed in the second surface 12. The magnetic current feeding structure 2 and the electric current feeding structure 3 are simultaneously excited in the cavity-back structure 4. Thereby, the magnetic current feeding structure 2 feeds a magnetic current into the radiation aperture 14 to make the radiation aperture 14 radiate a first electromagnetic wave having a first polarization direction; the electric current feeding structure 3 feeds an electric current into the radiation aperture 14 to make the radiation aperture 14 radiate a second electromagnetic wave having a second polarization direction. The second polarization direction is orthogonal to the first polarization direction. The phase difference of the radiation energy conversion of the different resonant mechanisms of the magnetic current feeding structure 2 and the electric current feeding structure 3 can be used to achieve the co-existence of the low coupling/low correlation characteristics of the antennas having high integration and the same operation frequency band. Thus, high isolation exists between the first electromagnetic wave radiated by the magnetic current feeding structure 2 and the second electromagnetic wave radiated by the electric current feeding structure 3. Because of surrounding the radiation aperture 4, the cavity-backed structure 4 can prevent the first electromagnetic wave and the second electromagnetic wave from environmental interference. Besides, the first surface 10 constrains the first electromagnetic wave and the second electromagnetic wave from radiating along a single direction, whereby the first electromagnetic wave and the second electromagnetic wave can radiate outward effectively.

Refer to FIG. 2 again. In some embodiments, the magnetic current feeding structure 2 includes a coupling opening 20, a crossing opening 22, and a first conductor 24. The coupling opening 20 is formed in a region of the second surface 12, which is adjacent to the first side 140. A region of the second metal layer 120, which is corresponding to the coupling opening 20, is an aperture etching area revealing the second surface 12 of the substrate 10. One end of the coupling opening 20 is connected with the first side 140, and another end of the coupling opening 20 extends toward a direction far away from the radiation aperture 14. The crossing opening 22 is formed in a region of the second surface 12, which is between (or crossed by) two ends of the coupling opening 20, wherein a region of the second metal layer 120, which is corresponding to the crossing opening 22, is an aperture etching area revealing the second surface 12. The first conductor 24 is disposed inside the crossing opening 22 and extends inside a region, which is between two ends of the coupling opening 20. The first conductor 24 receives a first feeding source and transmits the first feeding source to make the first feeding source coupled to the coupling opening 20. The first feeding source is transmitted to the radiation aperture 12 through the coupling opening 20, and the edge of the radiation aperture 14 radiates the magnetic current in the form of the first electromagnetic wave.

The electric current feeding structure 3 includes a tunnel opening 30 and a second conductor 32. The tunnel opening 30 is formed in a region of the second surface 12, which is adjacent to the second side 142. One end of the tunnel opening 30 communicates with the radiation aperture 14 and is opposite to one end of the coupling opening 20. Another end of the tunnel opening 30 extends to a region outside the radiation aperture 14. The second conductor 32 is disposed on the second surface 12 and inside the radiation aperture 14 and the tunnel opening 30. The second conductor 32 is separated from the second side 142 by a distance. The second conductor 32 receives a second feeding source and transmits the second feeding source to the radiation aperture 14. The second conductor 32 inside the radiation aperture 14 radiates the electric current in the form of the second electromagnetic wave. It should be further explained herein: the radiation aperture 14, the coupling opening 20, the crossing opening 22, the first conductor 24, the tunnel opening 30, and the second conductor 32 may be formed via etching the second metal layer 120, which covers all the second surface 12. However, the present invention is not limited by the abovementioned embodiment.

First Embodiment of the Present Invention

Refer to FIG. 2 and FIG. 3. One end of the crossing opening 22 passes through the coupling opening 20, and another end of the crossing opening 22 extends toward a region of the second surface 12, which is outside the cavity-backed structure 4, and reaches a perimeter of the substrate 1. The first conductor 24 is a first metal transmission line. The first metal transmission line extends from one end of the crossing opening 22 to another end of the crossing opening 22 and further extends along a lateral side of the substrate 1 to a first feeding source receiving port, which is formed on the first surface 10, to receive the first feeding source.

Another end of the tunnel opening 30 extends to a perimeter of the substrate 1. The second conductor 32 comprises a second metal transmission line 320 and a third metal transmission line 322. The second metal transmission line 320 is disposed inside the radiation aperture 14. One end of the third metal transmission line 322 is connected with the second metal transmission line 320 at one end of the tunnel opening 30. Another end of the third metal transmission line 322 extends to another end of the tunnel opening 30 to reach a perimeter of the second surface 12 and further extends along a lateral side of the substrate 1 to a second feeding source receiving port, which is formed on the first surface 10, to receive the second feeding source.

Second Embodiment of the Present Invention

Figure 5:
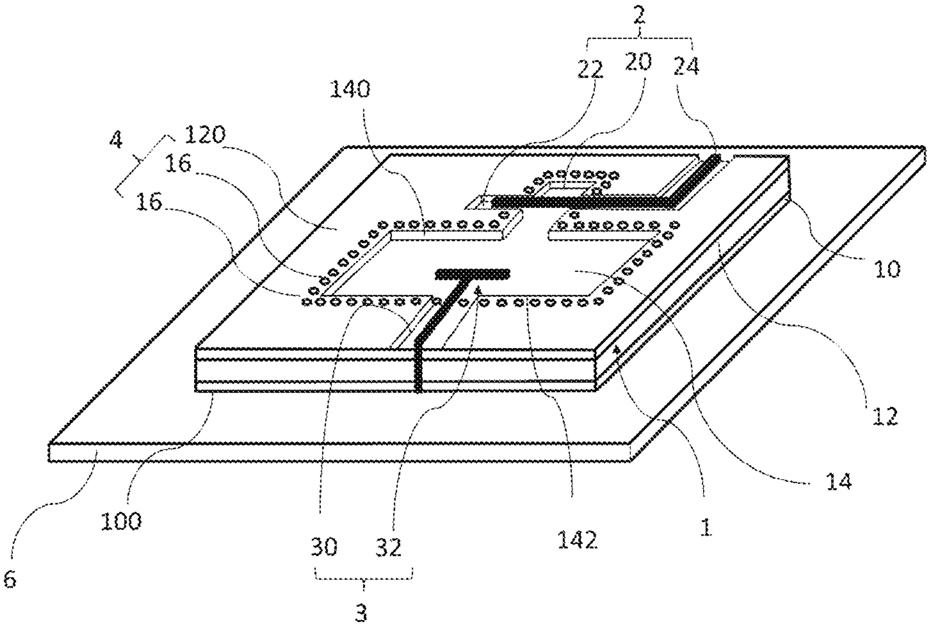
FIG. 5 is a perspective view schematically showing a package module according to one embodiment of the present invention.

Refer to FIG. 5. One end of the crossing opening 22 passes through the coupling opening 20; another end of the crossing opening 22 extends toward a region of the second surface 12, which is outside the cavity-backed structure 4. The first conductor 24 is a first metal transmission line. The first metal transmission line is disposed inside the crossing opening 22. A second metallic through via 26 is formed in a region of the substrate 1, which is outside the cavity-backed structure 4 and corresponding to the first metal transmission line. One end of the second metallic through via 26 is connected with the first metal transmission line; another end of the metallic through via 26 is connected with the first feeding source receiving port, which is formed on the first surface 10, to receive the first feeding source.

In the second embodiment, another end of the tunnel opening 30 is extended to a region of the substrate 1, which is outside the cavity-backed structure 4. The second conductor 32 includes a second metal transmission line 320, a third metal transmission line 322, and a third metallic through via 324. The second metal transmission line 320 is disposed inside the radiation aperture 14. One end of the third metal transmission line 322 is connected with the second metal transmission line 320 at one end of the tunnel opening 30. Another end of the third metal transmission line 322 extends to another end of the tunnel opening 30. The third metallic through via 324 penetrates the substrate 1. One end of the third metallic through via 324 is connected with the third metal transmission line 322; another end of the third metallic through via 324 is connected with a second feeding source receiving port, which is formed on the first surface 10, to receive the second feeding source.

In the two embodiments mentioned above, the combination of the second metal transmission line 320 and the third metal transmission line 322 is a T-shaped structure. However, the present invention is not limited by the two embodiments. Besides, the magnetic current feeding structure 2 and the electric current feeding structure 3 are not limited to the antenna feeding structures described above. As long as antenna feeding structures can respectively feed electric current and magnetic current to generate electromagnetic waves in the same plane, they would belong to the scope of the present invention.

Figure 6:
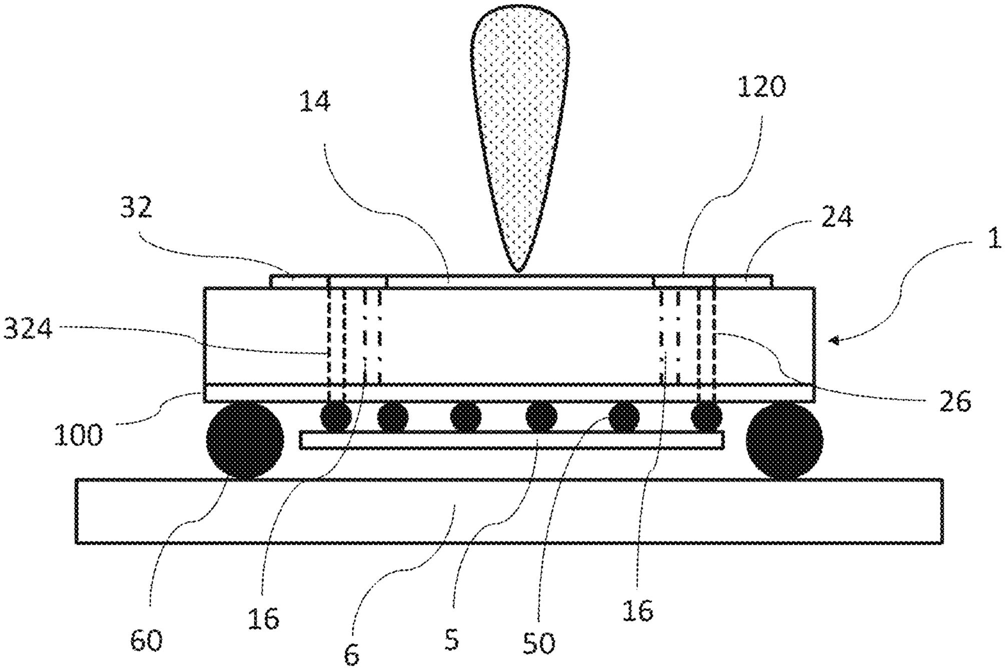
FIG. 6 is a sectional view schematically showing a package module according to one embodiment of the present invention.

Refer to FIG. 5 and FIG. 6. The present invention also provides a package module, which comprises a radio-frequency control unit 5, a control-circuit unit 6, and the dual-polarization cavity-backed antenna mentioned above. The radio-frequency control unit 5 includes a plurality of first metallic balls 50. The plurality of first metallic balls 50 is connected with the dual-polarization cavity-backed antenna. The control-circuit unit 6 includes a plurality of second metallic balls 60. The plurality of second metallic balls 60 is also connected with the dual-polarization cavity-backed antenna. Two of the plurality of first metallic balls 50 or two of the plurality of second metallic balls 60 are respectively a first feeding source output port and a second feeding source output port. The first feeding source output port is connected with the first feeding source. The second feeding source output port is connected with the second feeding source. Therefore, the dual-polarization cavity-backed antenna of the present invention can be easily integrated with the radio-frequency control unit 5 (such as an RF control chip) and the control-circuit unit 6 of an electronic device (such as a circuit board) and suitable for mass-production. The droplet-like shape in FIG. 6 represents a unidirectional radiation.

Figure 7:
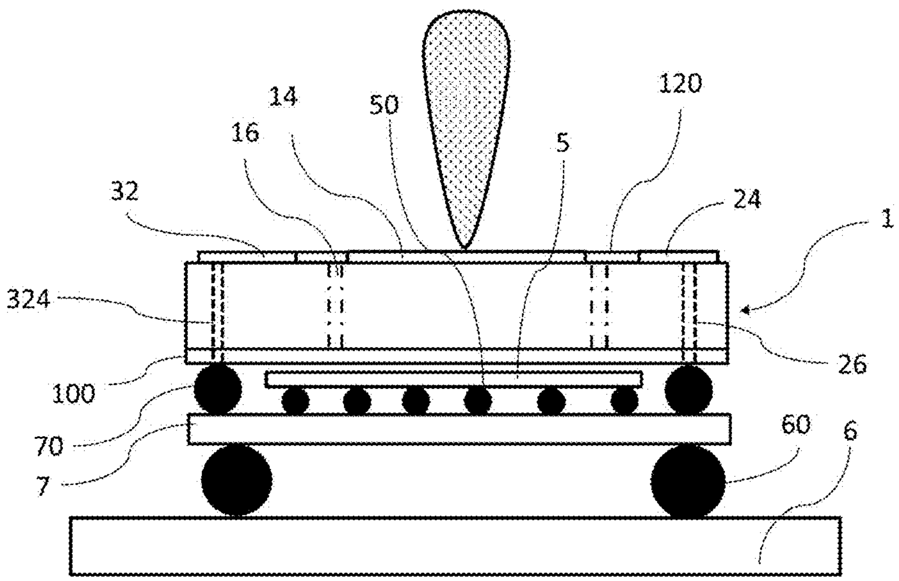
FIG. 7 is a sectional view schematically showing a package module according to another embodiment of the present invention.

Refer to FIG. 7. The droplet-like shape in FIG. 7 also represents a unidirectional radiation. The present invention further provides a package module, which comprises a radio-frequency control unit 5, a control-circuit unit 6, an IC carrier board 7, and the dual-polarization cavity-backed antenna mentioned above. The radio-frequency control unit 5 includes a plurality of first metallic balls 50. The plurality of first metallic balls 50 is connected with the IC carrier board 7. The control-circuit unit 6 includes a plurality of second metallic balls 60. The plurality of second metallic balls 60 is connected with the IC carrier board 7. The IC carrier board 7 includes a plurality of third metallic balls 7. Two of the plurality of third metallic balls 70 are respectively a first feeding source output port and a second feeding source output port. The first feeding source output port is connected with the first feeding source. The second feeding source output port is connected with the second feeding source. Thereby, the dual-polarization cavity-backed antenna of the present invention can be connected with the radio-frequency control unit 5 and the control-circuit unit 6 through the IC carrier board 7, and the IC carrier board 7, the radio-frequency control unit 5 and the control-circuit unit 6 can transmit signals to each other.

Figure 8:
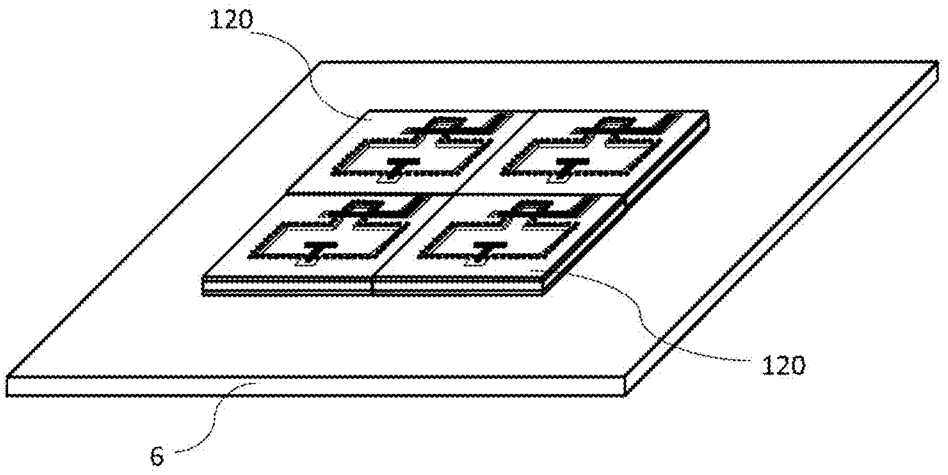
FIG. 8 is a perspective view schematically showing an array package module according to one embodiment of the present invention.
Figure 9:
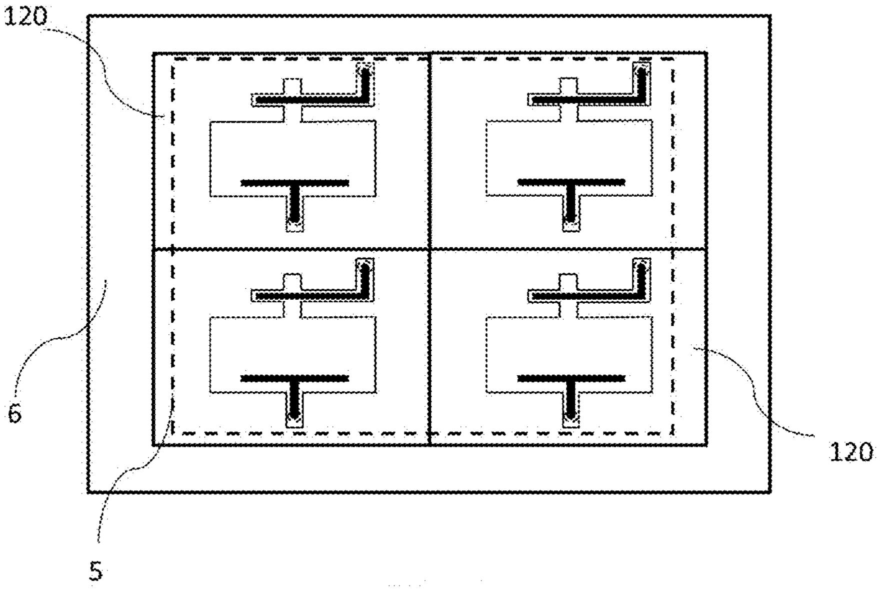
FIG. 9 is a top view schematically showing an array package module according to one embodiment of the present invention.
Figure 10:
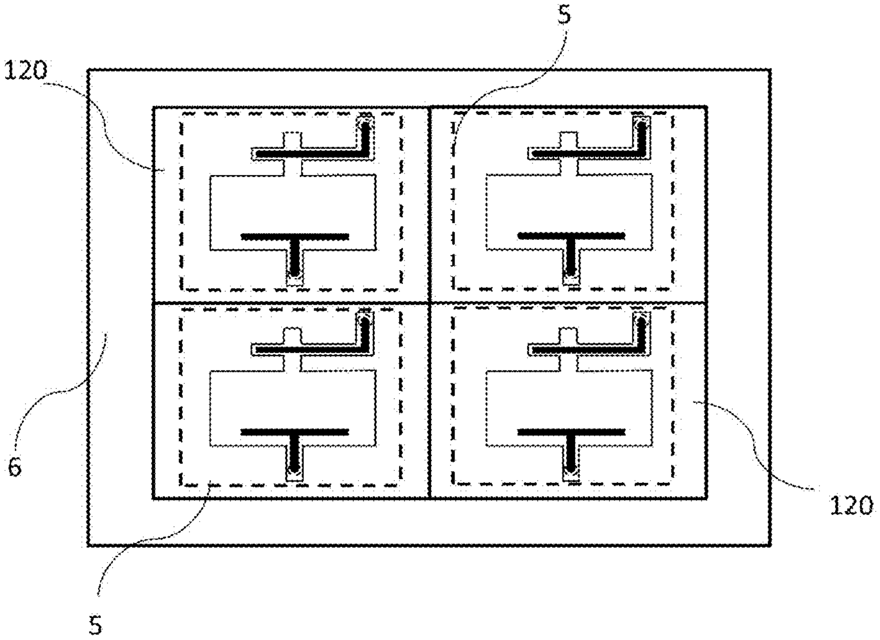
FIG. 10 is a top view schematically showing an array package module according to another embodiment of the present invention.

Refer to FIG. 8. The present invention further provides an array package module. The array package module is different from the package module in that the array package module comprises a plurality of dual-polarization cavity-backed antennas. The radio-frequency control unit 5 includes a single RF chip or a plurality of RF chips. The single RF chip of the radio-frequency control unit is connected with the plurality of dual-polarization cavity-backed antennas, whereby the RF chip can control the plurality of dual-polarization cavity-backed antennas, as shown in FIG. 9. Alternatively, each of the plurality of RF chips of the radio-frequency control unit 5 is connected with one of the plurality of dual-polarization cavity-backed antennas, whereby each RF chip can control the dual-polarization cavity-backed antenna connected thereto, as shown in FIG. 10.

Figure 11:
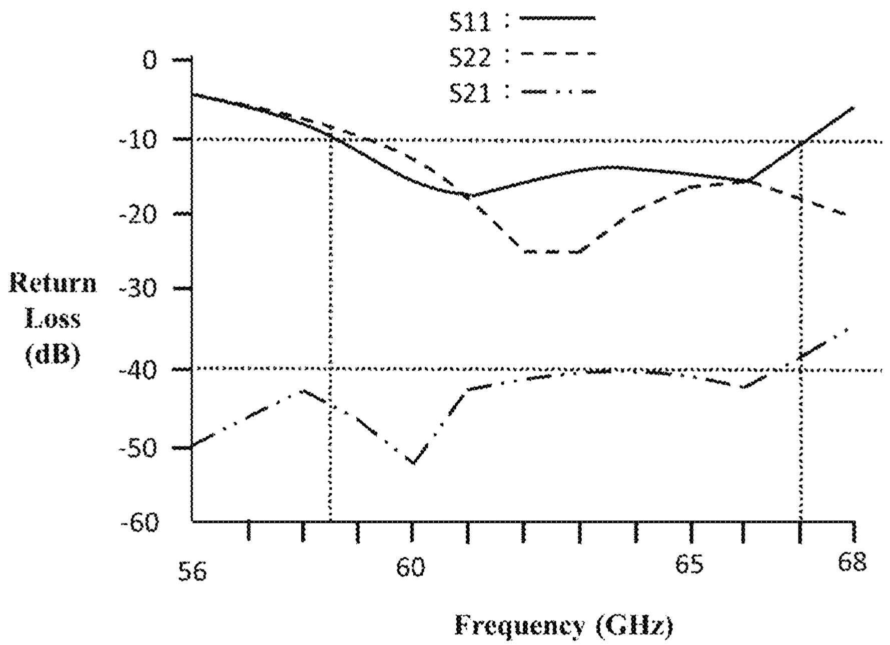
FIG. 11 shows the relationship of frequency and return loss of the dual-polarization cavity-backed antenna of the present invention.

Refer to FIG. 11. FIG. 11 shows the relationship of frequency and return loss of the dual-polarization cavity-backed antenna of the present invention, wherein Curve S11 is the relationship of frequency and return loss of the electric current feeding structure; Curve S22 is the relationship of frequency and return loss of the magnetic current feeding structure; Curve S21 is the isolation of the electric current feeding structure and the magnetic current feeding structure. It is learned from Curve S11 and Curve S22: the magnetic current feeding structure 3 and the electric current feeding structure 2 cover 57-64 GHz of the 60 GHz ISM frequency band. It is learned from Curve S21: the isolation between the magnetic current feeding structure 3 and the electric current feeding structure 2 is greater than 40 dB. The magnetic current feeding structure 3 and the electric current feeding structure 2 of the present invention feature superior isolation of frequency bands and have very low signal interference therebetween.

In conclusion, the electric current feeding structure 2 and the magnetic current feeding structure 3 of the present invention generate the first electromagnetic wave and the second electromagnetic wave in the second surface 12 respectively using different radiation methods. Therefore, the present invention increases the isolation degree between the first electromagnetic wave and the second electromagnetic wave, overcomes the interference between the first electromagnetic wave and the second electromagnetic wave, and constrains the first electromagnetic wave and the second electromagnetic wave to radiate into space along a single direction. Thus, while the dual-polarization cavity-backed antenna, the radio-frequency control unit 5, and the control-circuit unit 6 are assembled to form the package module, the first electromagnetic wave and the second electromagnetic wave can be effectively propagated outward. Further, because the dual-polarization cavity-backed antenna can be easily integrated with the radio-frequency control unit 5 and the control-circuit unit 6, the present invention favors mass production.

The embodiments described above are only to exemplify the present invention but not to limit the scope of the present invention. Equivalent modifications or variations of these embodiments may be made by the persons skilled in the art without departing from the scope of the present invention and would be included by the scope of the present invention.

What is claimed is:

1. A dual-polarization cavity-backed antenna comprising:

a substrate having a first surface and a second surface opposite to the first surface, wherein a first metal layer is disposed on the first surface, a second metal layer is disposed on the second surface, a radiation aperture is formed on the second metal layer, a region of the second metal layer corresponding to the radiation aperture is an aperture etching area revealing the second surface, and two opposite lateral sides of the radiation aperture are respectively a first side and a second side;

a cavity-backed structure formed by a plurality of first metallic through vias, the first metal layer, and the second metal layer, the plurality of first metallic through vias being disposed between the first metal layer and the second metal layer and around the radiation aperture and electrically connected with the first metal layer and the second metal layer;

a magnetic current feeding structure disposed on the second surface, the magnetic current feeding structure feeding a magnetic current into the radiation aperture to enable the radiation aperture to radiate a first electromagnetic wave having a first polarization direction; and an electric current feeding structure disposed on the second surface, the electric current feeding structure feeding a current into the radiation aperture to enable the radiation aperture to radiate a second electromagnetic wave having a second polarization direction, wherein the second polarization direction is orthogonal to the first polarization direction;

wherein the magnetic current feeding structure and the electric current feeding structure radiate simultaneously the first electromagnetic wave and the second electromagnetic wave in the cavity-backed aperture which is co-located, a direction of an electric field of the first electromagnetic wave and a direction of a magnetic field of the second electromagnetic wave being co-existed; the cavity-backed structure isolates the first electromagnetic wave and the second electromagnetic wave from environmental interference; the first metal layer constrains the first electromagnetic wave and the second electromagnetic wave to radiate into space along a single direction.

2. The dual-polarization cavity-backed antenna according to claim 1, wherein the magnetic current feeding structure comprises:

a coupling opening formed in a region of the second surface, which is adjacent to the first side, wherein a region of the second metal layer corresponding to the coupling opening is the aperture etching area revealing the second surface, one end of the coupling opening is connected with the first side, and another end of the coupling opening extends toward a direction far away from the radiation aperture;

a crossing opening formed in a region of the second surface, which is between (or crossed by) two ends of the coupling opening, wherein a region of the second metal layer corresponding to the crossing opening is the aperture etching area revealing the second surface; and a first conductor disposed on the substrate and inside the crossing opening and extending inside a region between two ends of the coupling opening;

wherein the first conductor receives a first feeding source and transmits the first feeding source to make the first feeding source coupled to the coupling opening; the first feeding source is transmitted to the radiation aperture through the coupling opening; the radiation aperture radiates the magnetic current in form of the first electromagnetic wave.

3. The dual-polarization cavity-backed antenna according to claim 2, wherein one end of the crossing opening passes through a region between two ends of the coupling opening, and another end of the crossing opening extends toward a region of the second surface, which is outside the cavity-backed structure, and reaches a perimeter of the substrate;

the first conductor is a first metal transmission line; the first metal transmission line extends from one end of the crossing opening to another end of the crossing opening and further extends along a lateral side of the substrate to a first feeding source receiving port, which is formed on the first surface, to receive the first feeding source.

4. The dual-polarization cavity-backed antenna according to claim 2, wherein one end of the crossing opening passes through a region between two ends of the coupling opening, and another end of the crossing opening extends toward a region of the second surface, which is outside the cavity-backed structure;

the first conductor is a first metal transmission line; the first metal transmission line is disposed inside the crossing opening; a second metallic through via is formed in a region of the substrate, which is outside the cavity-backed structure and corresponding to the first metal transmission line; one end of the second metallic through via is connected with the first metal transmission line; another end of the second metallic through via is connected with the first feeding source receiving port, which is formed on the first surface, to receive the first feeding source.

5. The dual-polarization cavity-backed antenna according to claim 2, wherein the electric current feeding structure comprises:

a tunnel opening formed on a region of the second surface, which is adjacent to the second side, wherein a region of the second metal layer corresponding to the tunnel opening is the aperture etching area revealing the second surface; one end of the tunnel opening communicates with the radiation aperture and is opposite to one end of the coupling opening, and another end of the tunnel opening extends to a region outside the radiation aperture; and a second conductor disposed on the second surface and inside the radiation aperture and the tunnel opening, the second conductor being separated from the second side by a distance, wherein the second conductor receives a second feeding source and transmits the second feeding source to the radiation aperture; the second conductor inside the radiation aperture radiates the current in form of the second electromagnetic wave.

6. The dual-polarization cavity-backed antenna according to claim 5, wherein another end of the tunnel opening extends to a perimeter of the substrate; the second conductor comprises a second metal transmission line and a third metal transmission line, the second metal transmission line being disposed inside the radiation aperture, one end of the third metal transmission line being connected with the second metal transmission line at one end of the tunnel opening, and another end of the third metal transmission line extending to another end of the tunnel opening to reach a perimeter of the second surface and further extending along a lateral side of the substrate to a second feeding source receiving port, which is formed on the first surface, to receive the second feeding source.

7. The dual-polarization cavity-backed antenna according to claim 5, wherein another end of the tunnel opening is extended to a region of the substrate, which is outside the cavity-backed structure; the second conductor includes a second metal transmission line, a third metal transmission line, and a third metallic through via; the second metal transmission line is disposed inside the radiation aperture; one end of the third metal transmission line is connected with the second metal transmission line at one end of the tunnel opening; another end of the third metal transmission line extends to another end of the tunnel opening; the third metallic through via penetrates the substrate; one end of the third metallic through via is connected with the third metal transmission line; another end of the third metallic through via is connected with a second feeding source receiving port, which is formed on the first surface, to receive the second feeding source.

8. A package module comprising:

the dual-polarization cavity-backed antenna according to claim 5;

a radio-frequency control unit disposed with a plurality of first metallic balls; and a control-circuit unit disposed with a plurality of second metallic balls;

wherein two of the plurality of first metallic balls or two of the plurality of second metallic balls are respectively a first feeding source output port and a second feeding source output port, the first feeding source output port is connected with the first feeding source, and the second feeding source output port is connected with the second feeding source.

9. A package module comprising:

the dual-polarization cavity-backed antenna according to claim 5;

a radio-frequency control unit disposed with a plurality of first metallic balls;

a control-circuit unit disposed with a plurality of second metallic balls; and an IC carrier board disposed with a plurality of third metallic balls, two of the plurality of third metallic balls being respectively a first feeding source output port and a second feeding source output port, the first feeding source output port being connected with the first feeding source; the second feeding source output port being connected with the second feeding source;

wherein the plurality of first metallic balls and the plurality of second metallic balls are connected with the IC carrier board.

10. An array package module comprising:

a plurality of dual-polarization cavity-backed antennas according to claim 5;

a radio-frequency control unit disposed with a plurality of first metallic balls; and a control-circuit unit disposed with a plurality of second metallic balls;

wherein two of the plurality of first metallic balls or two of the plurality of second metallic balls are respectively a first feeding source output port and a second feeding source output port, the first feeding source output port is connected with the first feeding source, and the second feeding source output port is connected with the second feeding source.

* * * * *